(12) United States Patent
Choi et al.

(10) Patent No.: US 9,546,748 B2
(45) Date of Patent: Jan. 17, 2017

(54) PIPE CONNECTOR ASSEMBLY AND METHOD FOR CONNECTING A PIPE USING THE SAME

(75) Inventors: Anguen Choi, Suwon-si (KR); Seungjin Jung, Gunpo-si (KR)

(73) Assignee: WOOJUNG MECHATRONICS CO., LTD (KR)

( * ) Notice: Subject to any disclaimer, the term of this patent is extended or adjusted under 35 U.S.C. 154(b) by 278 days.

(21) Appl. No.: 14/346,027

(22) PCT Filed: Sep. 14, 2012

(86) PCT No.: PCT/KR2012/007363
§ 371 (c)(1),
(2), (4) Date: Mar. 20, 2014

(87) PCT Pub. No.: WO2013/048039
PCT Pub. Date: Apr. 4, 2013

(65) Prior Publication Data
US 2014/0232110 A1     Aug. 21, 2014

(30) Foreign Application Priority Data

Sep. 30, 2011  (KR) .................. 10-2011-0099669

(51) Int. Cl.
*F16L 21/02* (2006.01)
*F16L 19/065* (2006.01)
*F16L 37/091* (2006.01)

(52) U.S. Cl.
CPC .......... *F16L 19/0656* (2013.01); *F16L 37/091* (2013.01)

(58) Field of Classification Search
CPC .... F16L 19/0656; F16L 37/091; F16L 19/106; F16L 19/12

USPC .............................. 285/342, 382.7, 379, 354
See application file for complete search history.

(56) References Cited

U.S. PATENT DOCUMENTS

| | | | | |
|---|---|---|---|---|
| 5,366,261 A | * | 11/1994 | Ohmi ................. | F16L 19/0212 277/609 |
| 5,466,019 A | * | 11/1995 | Komolrochanaporn | F16L 19/12 285/339 |
| 5,553,901 A | * | 9/1996 | Serot ..................... | F16L 37/091 285/322 |

(Continued)

FOREIGN PATENT DOCUMENTS

| JP | 07224977 | 8/1995 |
|---|---|---|
| KR | 200346939 | 3/2004 |
| KR | 2020110005264 | 5/2011 |

OTHER PUBLICATIONS

International Search Report—PCT/KR2012/007363 dated Feb. 19, 2013.

*Primary Examiner* — Basil Katcheves
*Assistant Examiner* — Joshua Ihezie
(74) *Attorney, Agent, or Firm* — Cantor Colburn LLP

(57) ABSTRACT

A pipe connector assembly which is locked and assembled on a holder after required parts are assembled in sequence on a nut of a pipe connecting device during the process of connecting a joint of a pipe, and a method for connecting a pipe using same are disclosed. A holder can be unlocked from a nut only when a pipe is inserted up to a precise point in an insert hole in a part assembled to a nut for pipe fitting, and the assembly and method can not only ensure the assembled sequence of parts, but can accurately maintain the assembled position of a pipe.

9 Claims, 9 Drawing Sheets

(56) References Cited

U.S. PATENT DOCUMENTS

| | | | | |
|---|---|---|---|---|
| 5,957,509 | A * | 9/1999 | Komolrochanaporn | F16L 19/12 285/343 |
| 6,378,915 | B1 * | 4/2002 | Katz | F16L 19/086 277/604 |
| 6,851,728 | B2 * | 2/2005 | Minami | F16L 19/086 285/113 |
| 2009/0127803 | A1 * | 5/2009 | Chelchowski | F16L 47/04 277/622 |
| 2013/0168959 | A1 * | 7/2013 | Turk | F16L 19/065 285/342 |
| 2014/0145434 | A1 * | 5/2014 | Oh | F16L 25/0036 285/354 |

* cited by examiner

PIPE CONNECTOR ASSEMBLY AND METHOD FOR CONNECTING A PIPE USING THE SAME

TECHNICAL FIELD

The present invention relates to a pipe connector assembly which is locked and assembled on a holder after required parts are assembled in sequence on a nut of a pipe connecting device during the process of connecting a joint of a pipe, and to a method for connecting a pipe using the same, and more particularly, to a pipe connector assembly and a method for connecting a pipe using the same, in which a holder can be unlocked from a nut only when a pipe is inserted up to a precise point in an insert hole in a part assembled to a nut for pipe fitting, and the assembly and method can not only ensure the assembled sequence of parts, but can accurately maintain the assembled position of a pipe.

BACKGROUND ART

In general, a pipe is widely used for transporting a fluid such as water or oil or a gas. The pipe is manufactured by a uniform standard (length) due to limitations on transporting and handling to be sold.

Therefore, when a section longer than the standard length of the pipe or a curved section is constructed, a pipe connecting device must be used or the pipe must be welded to be connected.

There are various pipe connecting devices for connecting the pipe used for a piping. In particular, a pipe connecting device in which a grip ring is used to prevent a pipe inserted into a connector from escaping is widely used for pipe fitting due to easiness of a connecting work.

FIG. 1 is an exploded perspective view illustrating a conventional pipe connecting method. FIG. 2 is a vertical sectional view of FIG. 1. In the conventional pipe connecting method, as illustrated in FIGS. 1 and 2, a pipe 3 is inserted into a nut 2 including a female screw 2a and, in a state where an O-ring 6, a washer 5, and grip ring 4 are sequentially installed in the pipe 3, the nut 2 is screw combined with a male screw 1a of a piping 1.

Therefore, in a state where the grip ring 4 installed in the pipe 3 is kept close to a first stopper 1b of the piping 1, when a protrusion 2b of the nut 2 compresses the O-ring 6, since external circumferences of the O-ring 6 and the pipe 3 are sealed up to maintain air tightness and the washer 5 pushes the grip ring 4, a grip 4a of the grip ring 4 presses the pipe 3 to perform clamping so that the pipe 3 is not separated from the pipe connecting apparatus. Such an operation is performed until the nut 2 is completely screw tightened to the piping 1.

However, in the conventional pipe connecting method, there are limitations on the grip ring 4 inserted into the pipe 3 maintaining a predetermined insertion (installation) depth. Therefore, when the insertion depth of the grip ring 4 is small, the pipe 3 escapes from the pipe connecting device and, to the contrary, when the insertion depth of the grip ring 4 is large, the nut is tightened in a state where a leading end of the pipe 3 is kept close to a second stopper 1c of the piping when the nut 2 is screw combined with the piping 1 so that the grip ring 4 is damaged, the external circumference of the pipe 3 is scratched by the grip 4a, or a bottle neck phenomenon of the pipe is caused by excessive compression of the O-ring 6 to lead the pipe to escape from the pipe connecting device.

Furthermore, in the conventional pipe connecting method, when a worker makes a mistake or has poor workmanship, an assembly sequence of parts is changed so that the pipe 3 is separated from the pipe connecting device.

Due to the above-described problem, the pipe connector assembly illustrated in FIG. 3 is developed and used.

FIG. 3 is a vertical sectional view illustrating a conventional pipe connector assembly. FIG. 4 is a vertical sectional view illustrating that a pipe is inserted into an insert hole of parts in a state where a cover is separated from a housing. A first stopper 7a is formed in a housing 7 formed of synthetic resin so that the grip ring 4, the washer 5, and the O-ring 6 are assembled in the order and positions of the grip ring 4, the washer 5, and the O-ring 6 are determined. A second stopper 7b for restricting the insertion depth of the pipe 3 that passes through the grip ring 4, the washer 5, and the O-ring 6 is formed under the first stopper 7a. The grip ring 4, the washer 5, and the O-ring 6 assembled with the housing 7 are protected by a cover 8.

Therefore, in order to perform a connecting work of the pipe, when over 8 is removed from the housing 7 and the pipe 3 to be constructed is pushed to the insert hole of the parts, since the leading end of the pipe 3 is locked on the second stopper 7b and the grip ring 4, the washer 5, and the O-ring 6 are sequentially positioned on the external circumference of the pipe 3, the connecting work of the piping may be performed.

DISCLOSURE

Technical Problem

However, the conventional connecting method has a number of problems as follows.

First, the insertion depth of the pipe is limited so that the parts are sequentially inserted into the housing and the pipe is correctly inserted. However, a worker frequently separates the parts from the housing to manually assemble the parts with the pipe so that the above-described problem is repeatedly generated.

Second, since clamping of the pipe connecting device and the pipe is dependent on one grip ring, when a high pressure fluid or gas flows or the grip ring is defective, a clamping force of supporting the pipe is deteriorated so that the pipe is separated from the pipe connecting device.

When the pipe is separated or air tightness is not maintained so that a gas leaks in a state where the pipe through which the gas passes is installed indoors, a disaster is caused.

Third, since the pipe is not closely pushed to the second stopper of the piping in a process of screw combining the nut with the piping, the piping and the leading end of the pipe are separated from each other as illustrated in FIG. 2 so that a gap t is generated and the fluid or the gas leaks through the gap.

Fourth, since an inside of the nut is not sealed up so that moist permeates into the inside of the nut, the grip ring and the washer are corroded when they are used for a long time so that the clamping force is deteriorated.

An object of the present invention is to provide locking units in a dived holder and a nut with which parts are assembled so that the nut is not separated from the holder unless the pipe is inserted into an insert hole of the parts assembled with the nut and a worker may not discretionally separate the parts from the nut.

Another object of the present invention is to install another grip ring in a nut so that clamping forces of a pipe connecting device and a pipe may be maximized in a process of screw combining the nut with a piping.

Still another object of the present invention is to push a pipe to a piping immediately before a nut is completely screw tightened to the piping so that a leading end of the pipe may be kept close to a second stopper of the piping.

Still another object of the present invention is to prevent moist from permeating into an inside of a pipe connector so that first and second grip rings and a washer assembled with a nut are not corroded with the lapse of time.

Technical Solution

In order to achieve the above objects, according to an aspect of the present invention, there is provided a pipe connector assembly, including a first holder on whose external circumference a male screw is formed and in which a first stopper for restricting an insertion depth of parts inserted into a pipe and a second stopper for restricting a drop of a second holder are formed, the second holder combined with the first holder to rise and drop, an elastic unit for shifting the second holder in an upper direction, a net in which a female screw combined with the male screw of the first holder is formed, and a locking unit for locking the first holder in which parts are installed and the nut assembled with the first holder.

According to another aspect of the present invention, there is provided a pipe connecting method using a pipe connector assembly, including assembling first and second holders and sequentially assembling a first grip ring, a washer, an O-ring, and a second grip ring with a first stopper formed in the first holder, screw assembling a nut with the first holder with which the first grip ring, the washer, the O-ring, and the second grip ring are sequentially assembled to assemble the first holder and the nut, inserting a pipe into the nut so that parts are inserted into the pipe by an amount of drop of the second holder from a lower end of the pipe and releasing a locking unit, separating the nut from the first holder, and screw combining the nut with a piping to complete a pipe connecting work.

According to still another aspect of the present invention, there is provided a pipe connecting method using a pipe connector assembly, including assembling first and second holders and sequentially assembling a washer, an O-ring, and a second grip ring with a first stopper formed in the first holder, screw assembling a nut with the first holder with which the washer, the O-ring, and the second grip ring are sequentially assembled to assemble the first holder and the nut, inserting a pipe into the nut so that parts are inserted into the pipe by an amount of drop of the second holder from a lower end of the pipe and releasing a locking unit, separating the nut from the first holder, and screw combining the nut with a piping to complete a pipe connecting work.

Advantageous Effects

The present invention has the following advantages in comparison with a conventional pipe connector assembly and pipe connecting method.

First, a nut is assembled with a first holder in a state where parts are installed in the nut so that the nut and the first holder are locked on each other. Therefore, unless a worker inserts a pipe into an insert hole of the parts installed in the nut to release locking of the nut and a second holder, the nut and the second holder may not be separated from each other. Therefore, it is possible to prevent the worker from discretionally separating the pipe connector assembly.

Second, since clamping of a pipe connecting device and the pipe is performed by two grip rings on both sides of an O-ring so that a clamping force is maximized, although a high pressure fluid or gas flows through the pipe, it is possible to prevent the pipe from being separated from the pipe connecting device.

Therefore, the present invention may be usefully applied to a case in which a pipe through which a gas passes is installed indoors.

Third, although the pipe inserted into the first and second grip rings does not maintain a predetermined insertion (installation) depth, since an elastic piece of the second grip ring pushes the pipe to a piping immediately before the nut is completely tightened to the piping so that a leading end is kept close to a second stopper, it is possible to prevent the fluid or gas from leaking.

Fourth, since a groove into which the O-ring is inserted is formed in the nut so that the inside of the nut is sealed up, it is possible to prevent moist from permeating into the inside of the nut and to prevent the first and second grip rings and a washer from being corroded although the pipe connecting device is used for a long time.

DESCRIPTION OF DRAWINGS

FIG. 6 is a view illustrating a state before a pipe is assembled into an insert hole of parts assembled with a nut.

FIG. 7 is a view illustrating a state in which a pipe is assembled into an insert hole of parts assembled with a nut so that locking of a nut and a second holder is released.

BEST MODE FOR INVENTION

Hereinafter, an embodiment of the present invention will be described in detail with reference to FIGS. 5 to 9.

Figure 1:
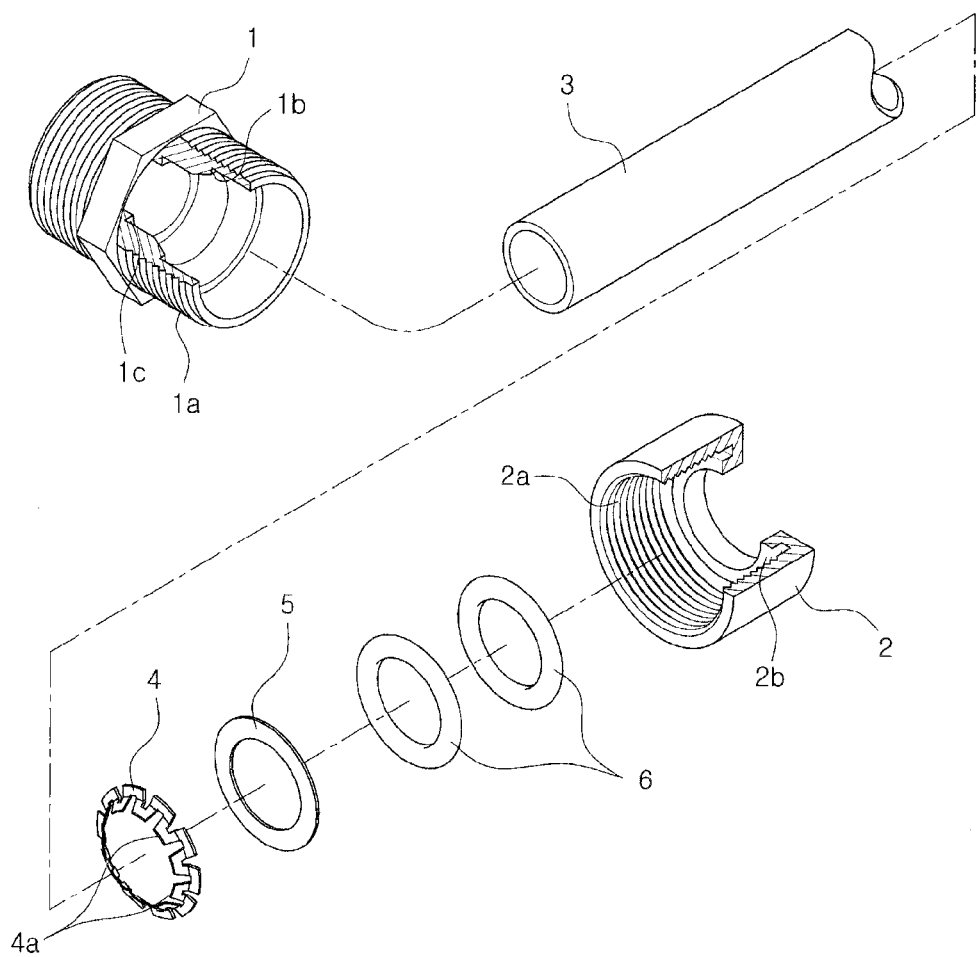
FIG. 1 is an exploded perspective view illustrating a conventional pipe connecting method.
Figure 2:
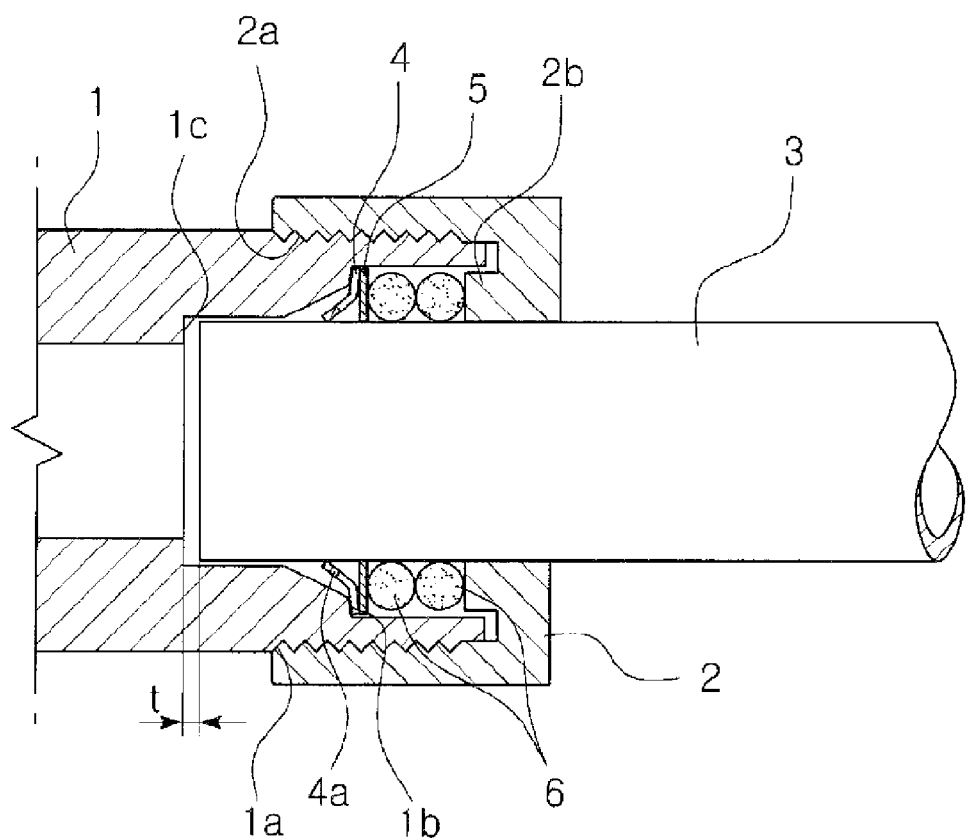
FIG. 2 is a vertical sectional view of FIG. 1.
Figure 3:
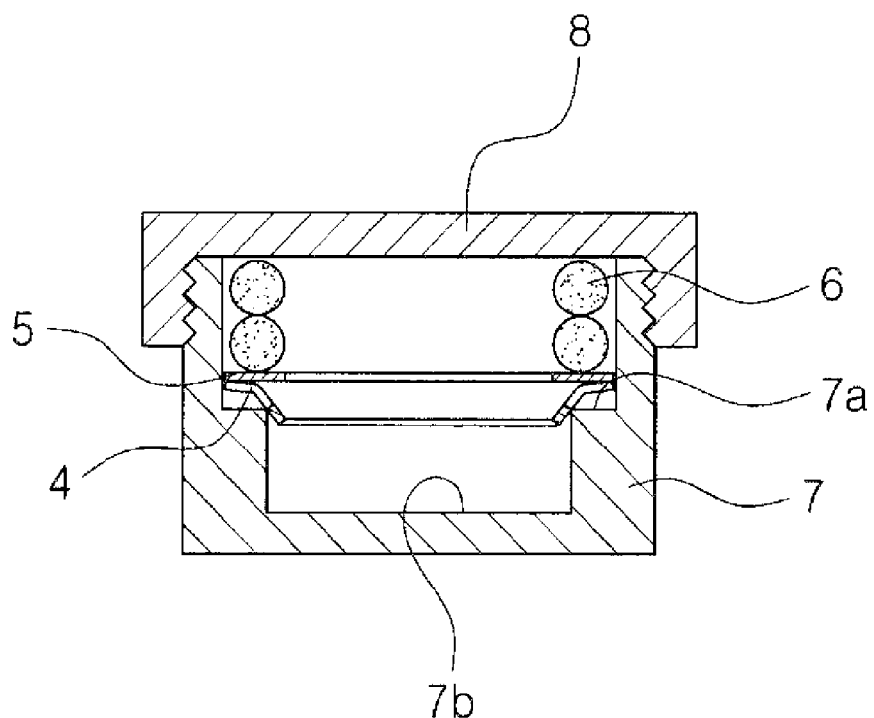
FIG. 3 is a vertical sectional view illustrating a conventional pipe connector assembly.
Figure 4:
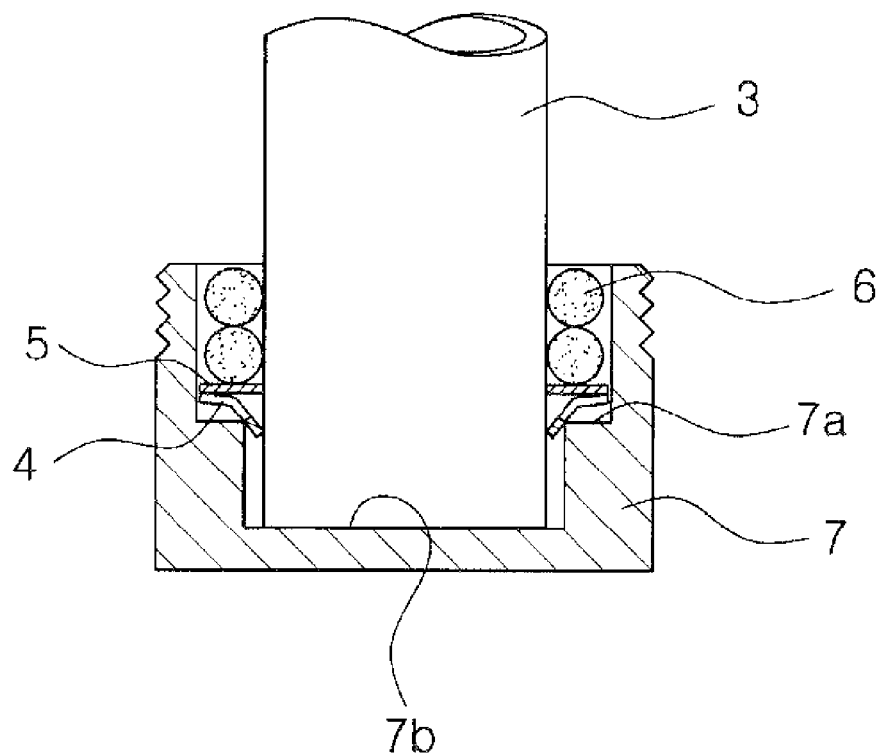
FIG. 4 is a vertical sectional view illustrating that a pipe is inserted into an insert hole of parts in a state where a cover is separated from a housing.
Figure 5:
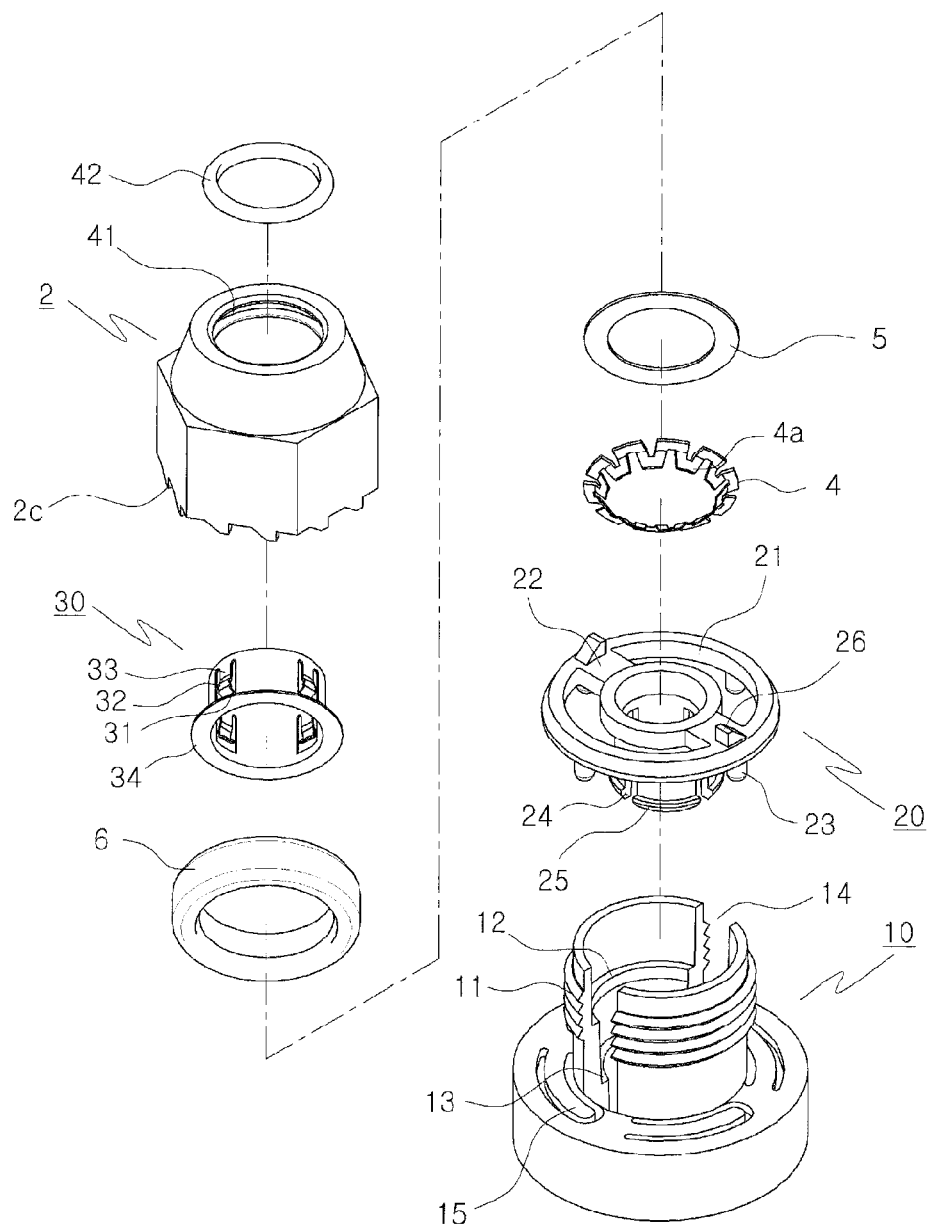
FIG. 5 is an exploded perspective view illustrating a pipe connector assembly according to the present invention.
Figure 6:
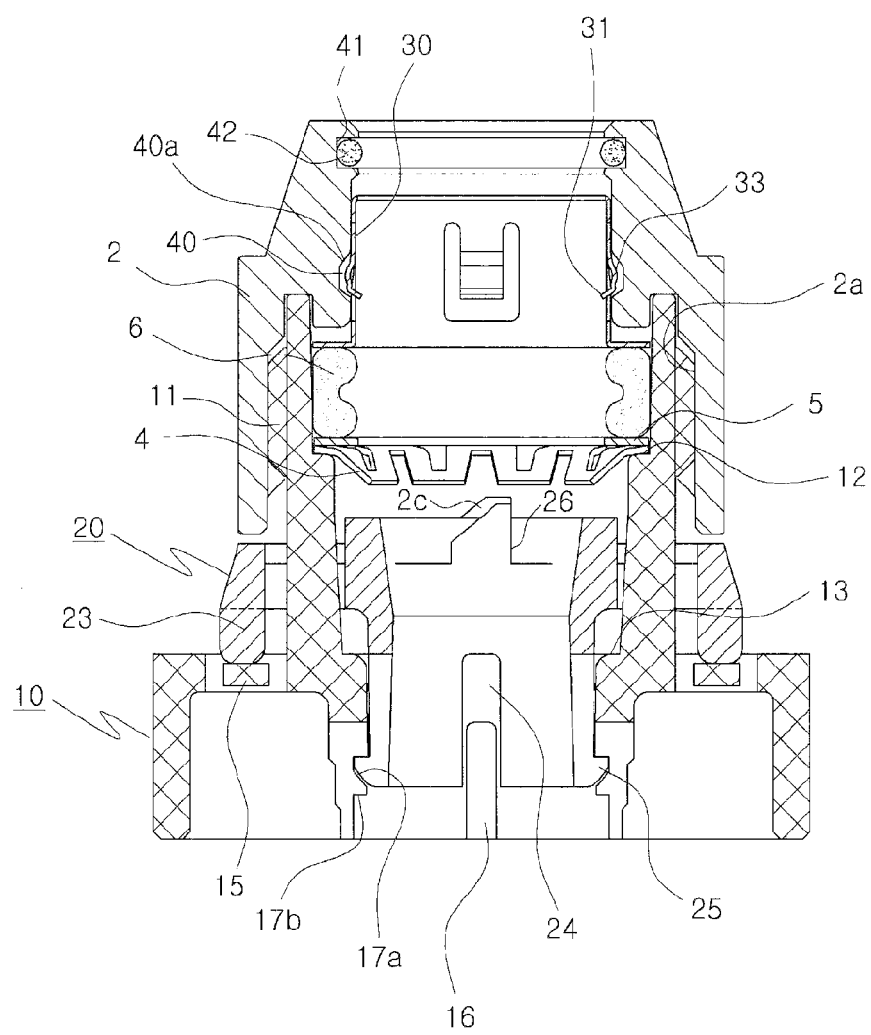
FIGS. 6 and 7 are vertical sectional views illustrating the combination state of FIG. 5.
Figure 7:
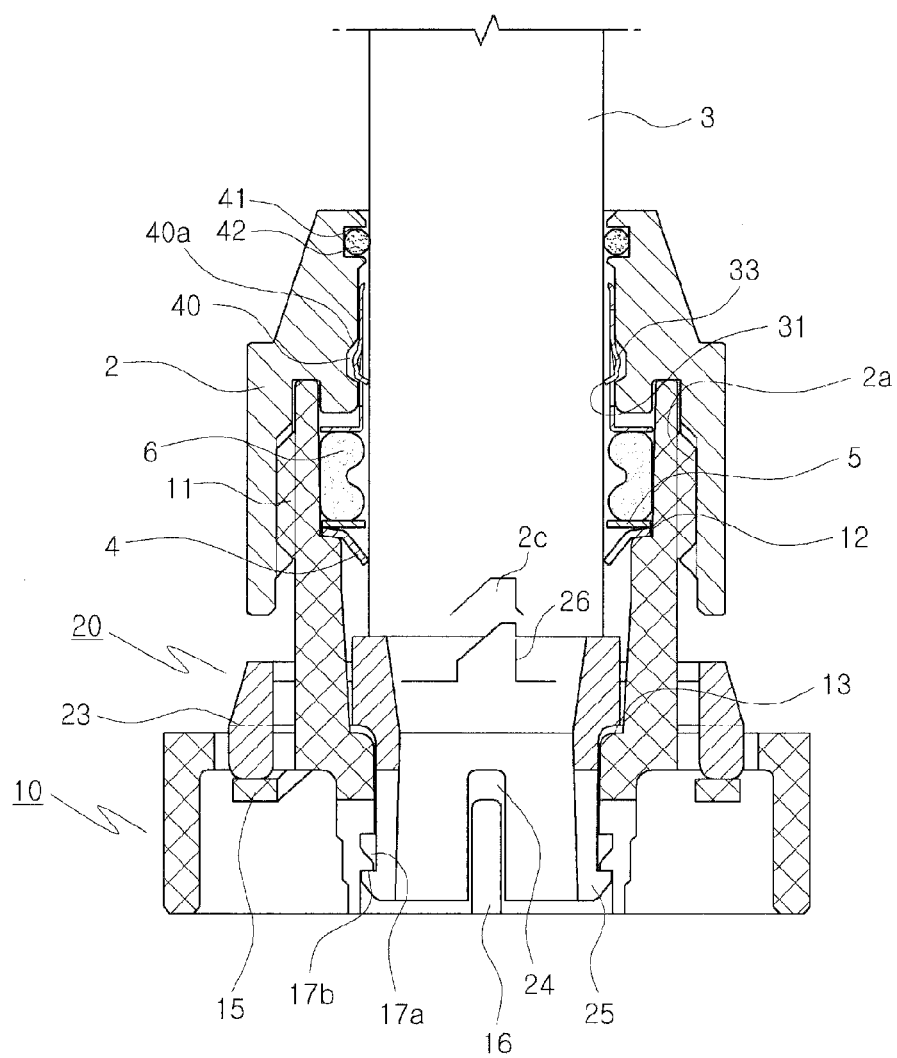
Figure 8:
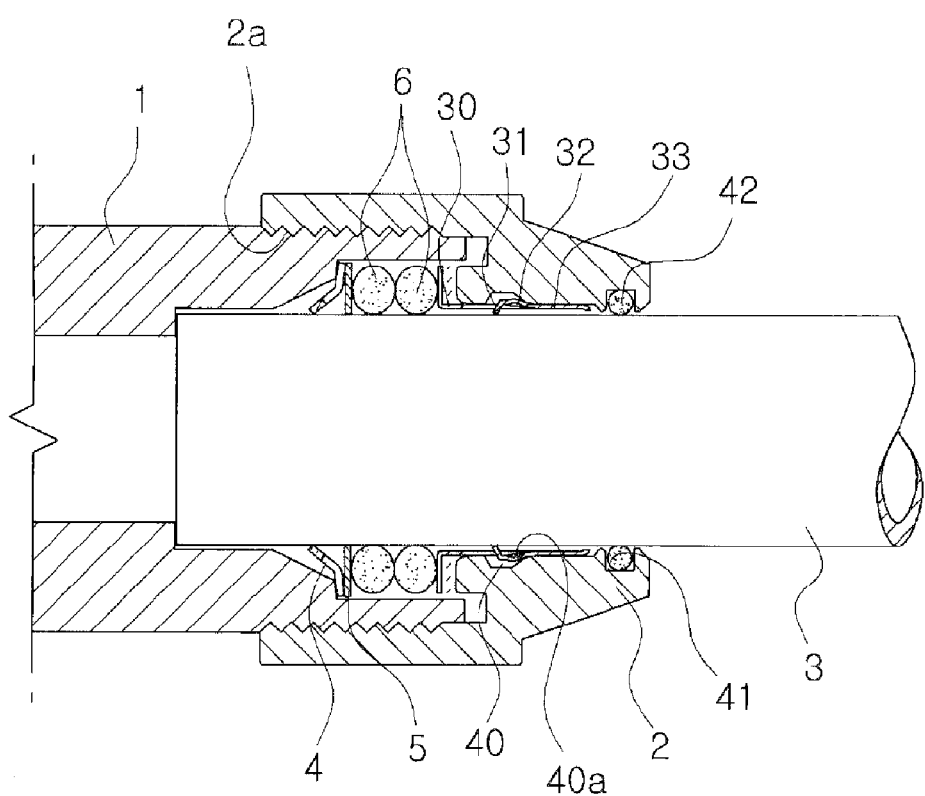
FIG. 8 is a vertical sectional view illustrating a state in which a pipe connecting work is performed according to the present invention.
Figure 9:
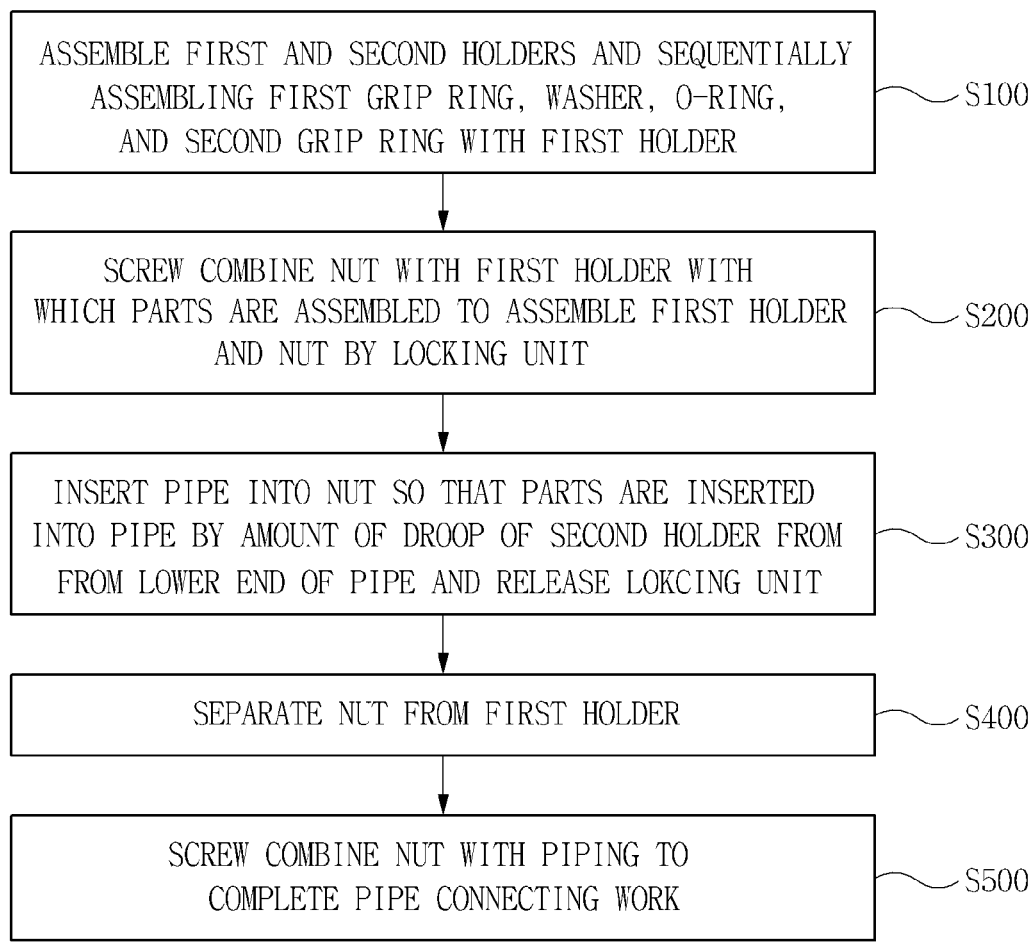
FIG. 9 is a flowchart illustrating a pipe connecting method according to the present invention.

FIG. 5 is an exploded perspective view illustrating a pipe connector assembly according to the present invention. FIGS. 6 and 7 are vertical sectional views illustrating the combination state of FIG. 5. FIG. 8 is a vertical sectional view illustrating a state in which a pipe connecting work is performed according to the present invention. According to the present invention, a male screw 11 is formed on an external circumference of a first holder 10, a first stopper 12 for restricting insertion depths of parts (a first grip ring, a washer, an O-ring, and a second grip ring) inserted into the first holder 10 and placed around a pipe 3 and a second stopper 13 for restricting a drop of a second holder 20 are formed in the first holder 10, and the second holder 20 is combined with the first holder 10 to rise and drop. The second holder 20 combined with the first holder 10 to rise and drop is formed to be shifted in an upper direction by an elastic unit.

A cut part 14 is formed in the first holder 10 in a vertical direction and a connecting piece 22 inserted into the cut part 14 is formed in the second holder 20 between openings 21 so that the second holder 20 may be assembled with the first holder 10.

The elastic unit for shifting the second holder 20 in the upper direction in the first holder 10 is illustrated as elastic pieces 15 formed in the first holder 10 and protrusions 23 formed in the second holder 20 in FIGS. 5 to 7 according to the embodiment of the present invention. However, a coil spring (not shown) installed between the first holder 10 and the second holder 20 may be used as the elastic unit according to another embodiment of the present invention.

In FIGS. 5 to 7 according to the embodiment of the present invention, four elastic pieces 15 are formed in the first holder 10 and the protrusions 23 of the same number as that of the elastic pieces 15 are formed in the second holder 20 to be connected to the elastic pieces 15. However, the number of protrusions 23 may vary.

Two locking grooves 17a and 17b having a cut part 16 are formed in a lower part of the first holder 10 and a locking protrusion 25 having a cut part 24 is formed in the second holder 20 so that the locking protrusion 25 is selectively inserted into the locking grooves 17a and 17b in accordance with whether the pipe is inserted.

On the other hand, a female screw 2a screw combined with the male screw 11 of the first holder 10 is formed on an internal circumference of a nut 2 screw combined with a piping 1 to form a pipe connecting device. Therefore, when the nut is assembled with the first holder 10 in a state where a first grip ring 4, a washer 5, an O-ring 6, and a second grip ring 30 are sequentially assembled to be put on a first stopper of the first holder 10, the nut 2 and the first holder 10 are locked on each other by the locking unit so that a worker may not discretionally separate the parts from the nut 2.

According to the present invention, only the second grip ring 6 may be used without using the first grip ring 4 used in a conventional art in a process of assembling the parts with the first holder 10.

The locking unit for assembling the first holder 10 and the nut 2 is illustrated as a latch 26 formed in an upper end of the second holder 20 and a latch groove 2c formed along a lower end of the nut 2 so that the latch may be selectively inserted in FIGS. 5 to 7 according to the embodiment of the present invention. However, the locking unit may vary.

In addition, an elastic piece 33 having an inward curved piece 31 and a protruding part 32 is provided in the second grip ring 30 positioned on the O-ring 6 and a groove 40 in which the elastic piece 33 is accommodated and that includes an inclined surface 40a is formed in the nut 2.

The inclined surface 40a is positioned in a rear end of the groove 40 in a fastening direction of the nut 2 so that the elastic piece 33 is accommodated in the groove 40 before the first grip ring 4 is kept close to the first stopper 1b of the piping 1 and the protruding unit 32 of the elastic piece 33 is pressed by the inclined surface 40a to clamp the pipe 3 when the first grip ring 4 contacts the first stopper 1b and the O-ring 6 starts to be pressed by the second grip ring 30 and pushes the pipe 3 to the second stopper 1c to be kept close when the leading end of the pipe 3 does not contact the second stopper 1c of the piping 1.

At this time, one or more elastic piece 33 may be formed in the second grip ring 30.

A flange 34 may be integrated with a leading end of the second grip ring 30 to stably push the O-ring 6 in a process of fastening the nut 2.

In addition, referring to FIG. 8, the O-rings 6 positioned between the washer 5 and the second grip ring 30 may be separately formed as two separate O-rings. However, the two O-rings 6 are preferably integrated with each other in order to simplify the parts according to the embodiment of the present invention.

A circular groove 41 is formed on an opposite side of the nut 2 in which the female screw 2a is formed and another O-ring 42 is inserted into the groove 41 to be connected to the external circumference of the pipe 3 in order to prevent moist from permeating into the inside of the nut 2 and to prevent the first and second grip rings 4 and 30 and the washer 5 from being corroded.

An operation of the present invention will be described as follows.

First, when a connecting piece 22 is inserted so that the latch 26 formed in the second holder 20 faces upward through the cut part 14 formed in the divided first holder 10, the locking protrusion 25 provided in the second holder 20 is locked on the locking groove 17a formed in an upper part to be assembled. At this time, the protrusions 23 formed in the second holder 20 are connected to the upper parts of the elastic pieces 15 so that the elastic pieces 15 are not pressed.

The first grip ring 4, the washer 5, the O-ring 6, and the second grip ring 30 are sequentially assembled with the first holder 10 so that the parts are put on the first stopper 12 and the other O-ring 42 is assembled with the groove 41 of the nut 2 S100.

However, an object may be achieved without using the first grip ring 4. When the first and second holders 10 and 20 are assembled with each other and the parts are assembled with the first holder 10, the nut 2 is screw assembled with the first holder 10 so that the nut 2 and the first holder 10 are assembled with each other by the locking unit S200.

That is, when the female screw 2a of the nut 2 is screw combined with the male screw 11 formed in the first holder 10 so that the first grip ring 4 is locked on the first stopper 12 formed in the first holder 10, the latch 26 formed on the second holder 20 is locked on the latch groove 2c formed in the lower end of the nut 2 as illustrated in FIG. 6.

When the first and second holders 10 and 20 and the nut 2 are assembled, since the first and second holders 10 and 20 and the nut 2 may not be discretionally released during distribution of the pipe connector assembly or a work, it is possible to prevent the parts from being separated from the nut 2 due to poor workmanship.

According to the embodiment of the present invention, locking is performed by the latch groove 2c and the latch 26. However, various locking units may be applied.

Therefore, in order to perform the pipe connecting work by the pipe connector assembly according to the present invention, in the state of FIG. 6, when the pipe 3 is inserted into the insert hole of the parts assembled with the nut 2 so that a lower end is connected to the upper surface of the second holder 20 and the pipe 3 is pressed, the protrusion 23 of the second holder 20 presses the elastic pieces 15 of the first holder 10 to drop.

Therefore, since the locking protrusion 25 positioned in the locking groove 17a is inserted into the locking groove 17b as illustrated in FIG. 7 so that the latch 26 formed in the second holder 20 is separated from the latch groove 2c of the nut 2 and locking is automatically released, the nut 2 screw combined with the first holder 10 is unfastened so that the nut 2 and the first holder 10 may be separated from each other S300 and S400.

In the above-described operation, since the pipe 3 drops until the second holder 20 is locked on the second stopper 13 formed in the first holder 10 and the pipe is held by the inward curved piece 31 of the second grip ring 30 so that the pipe does not fall out in an opposite direction of insertion, the parts positioned on the external circumference of the pipe 3 are positioned in a predetermined depth from the lower end of the pipe 3.

When the nut 2 is separated from the first and second holders 10 and 20, the nut 2 with which the first grip ring 4, the washer 5, the O-ring 6, and the second grip ring 30 are sequentially assembled is screw combined with the male screw 1a of the piping 1. When the nut 2 is tightened so that the first grip ring 4 is locked on the first stopper 1b of the piping 1, since the first grip ring 4 and the washer 5 do not proceed further, the O-ring 6 is pressed by a tightening force of the nut 2 so that air tightness is maintained.

When the nut 2 reaches a point of 1.5 mm immediately before the nut 2 is tightened by the above-described operation to be completely fastened to the piping 1, that is, the nut 2 is completely fastened, since the nut 2 is tightened in a state where the protruding part 32 of the elastic part 33 positioned in the groove 40 is pressed by the inclined surface 40a of the groove 40 to clamp the external circumference of the pipe 3, the clamping force of the pipe 3 is remarkably improved in comparison with the conventional pipe connecting device. Therefore, although the high pressure fluid or gas flows through the pipe 3, it is possible to prevent the pipe 3 from being separated from the pipe connecting device and to prevent the high pressure fluid or gas from leaking from a pipe connecting part.

Although the leading end of the pipe 3 is not connected to the second stopper 1c in a state where the first grip ring 4 is kept close to the first stopper 1b of the piping 1, since the nut 2 is fastened in a state where the external circumference of the pipe 3 is pressed by the inward curved piece 31 to be clamped to push the pipe 3 to the piping 1, the leading end of the pipe 3 is moved until the pipe 3 is kept close to the second stopper 1c as illustrated in FIG. 8 (S500).

While this invention has been described in connection with what is presently considered to be practical exemplary embodiments, it is to be understood that the invention is not limited to the disclosed embodiments.

Also, it is to be understood that a person having ordinary skill in the art can cover various modifications and equivalent arrangements to the invention within the spirit and scope of the appended claims

MODE FOR INVENTION

According to an aspect of the present invention, there is provided a pipe connector assembly, including a first holder on whose external circumference a male screw is formed and in which a first stopper for restricting an insertion depth of parts inserted into a pipe and a second stopper for restricting a drop of a second holder are formed, the second holder combined with the first holder to rise and drop, an elastic unit for shifting the second holder in an upper direction, a net in which a female screw combined with the male screw of the first holder is formed, and a locking unit for locking the first holder in which parts are installed and the nut assembled with the first holder.

According to another aspect of the present invention, there is provided a pipe connecting method using a pipe connector assembly, including assembling first and second holders and sequentially assembling a first grip ring, a washer, an O-ring, and a second grip ring with a first stopper formed in the first holder, screw assembling a nut with the first holder with which the first grip ring, the washer, the O-ring, and the second grip ring are sequentially assembled to assemble the first holder and the nut, inserting a pipe into the nut so that parts are inserted into the pipe by an amount of drop of the second holder from a lower end of the pipe and releasing a locking unit, separating the nut from the first holder, and screw combining the nut with a piping to complete a pipe connecting work.

According to still another aspect of the present invention, there is provided a pipe connecting method using a pipe connector assembly, including assembling first and second holders and sequentially assembling a washer, an O-ring, and a second grip ring with a first stopper formed in the first holder, screw assembling a nut with the first holder with which the washer, the O-ring, and the second grip ring are sequentially assembled to assemble the first holder and the nut, inserting a pipe into the nut so that parts are inserted into the pipe by an amount of drop of the second holder from a lower end of the pipe and releasing a locking unit, separating the nut from the first holder, and screw combining the nut with a piping to complete a pipe connecting work.

INDUSTRIAL APPLICABILITY

The present invention may be used for a device that requires a piping such as an air conditioner.

The invention claimed is:

1. A pipe connector assembly, comprising:
   a first holder (10) on whose external circumference a male screw (11) is formed and in which a first stopper (12) for restricting an insertion depth of parts inserted into the first holder (10) and a second stopper (13) for restricting a drop of a second holder (20) are formed;
   the second holder (20) combined with the first holder (10) to rise and drop;
   an elastic unit for shifting the second holder (20) in an upper direction;
   a nut (2) in which a female screw (2a) combined with the male screw (11) of the first holder (10) is formed; and
   a locking unit for locking the first holder (10) in which parts are installed and the nut assembled with the first holder (10),
   wherein two locking grooves (17a and 17b) having a cut part (16) are formed in a lower part of the first holder (10) and a locking protrusion (25) having a cut part (24) is formed in the second holder (20) so that the locking protrusion (25) is selectively inserted into any one of the two locking grooves (17a and 17b).

2. The pipe connector assembly of claim 1, wherein the elastic unit is elastic pieces (15) formed in the first holder (10) and protrusions (23) formed in the second holder (20).

3. The pipe connector assembly of claim 1, wherein the locking unit for assembling the first holder (10) and the nut (2) comprises a latch (26) formed in an upper end of the second holder (20) and a latch groove (2c) formed along a lower end of the nut (2) so that the latch is selectively inserted.

4. The pipe connector assembly of claim 1, wherein the parts inserted into the first holder (10) are a first grip ring (4), a washer (5), an O-ring (6), and a second grip ring (30) that are sequentially arranged.

5. The pipe connector assembly of claim 4, wherein an elastic piece (33) having an inward curved piece (31) and a protruding part (32) is provided in the second grip ring (30) positioned on the O-ring (6); and wherein a groove (40) in which the elastic piece (33) is accommodated and that includes an inclined surface (40*a*) is formed in the nut (2).

6. The pipe connector assembly of claim 5, wherein the elastic piece (33) includes a plurality of elastic pieces (33).

7. The pipe connector assembly of claim 5, wherein a flange (34) is formed at a leading end of the second grip ring (30).

8. The pipe connector assembly of claim 1, wherein a circular groove (41) is formed on an opposite side of the nut (2) in which the female screw (2*a*) is formed and an O-ring (42) is inserted into the groove (41).

9. The pipe connector assembly of claim 4, wherein the O-ring (6) includes a first O-ring and a second O-ring.

* * * * *